United States Patent
Rubin et al.

(10) Patent No.: US 8,616,974 B2
(45) Date of Patent: Dec. 31, 2013

(54) PASSIVE AND ACTIVE VIDEO GAME CONTROLLERS WITH MAGNETIC POSITION SENSING

(75) Inventors: Amir Rubin, Los Gatos, CA (US); Jeffrey Peter Bellinghausen, San Jose, CA (US)

(73) Assignee: Sixense Entertainment, Inc., Los Gatos, CA (US)

( * ) Notice: Subject to any disclaimer, the term of this patent is extended or adjusted under 35 U.S.C. 154(b) by 1002 days.

(21) Appl. No.: 12/501,191

(22) Filed: Jul. 10, 2009

(65) Prior Publication Data

US 2010/0009752 A1 Jan. 14, 2010

Related U.S. Application Data

(60) Provisional application No. 61/134,499, filed on Jul. 10, 2008.

(51) Int. Cl.
*A63F 13/02* (2006.01)

(52) U.S. Cl.
USPC ............... 463/39; 463/36; 463/37; 463/38

(58) Field of Classification Search
USPC ............... 463/46, 47, 1–6, 36–39; 702/134
See application file for complete search history.

(56) References Cited

U.S. PATENT DOCUMENTS

| | | | |
|---|---|---|---|
| 3,683,378 A | 8/1972 | Pohlemus | |
| 4,017,858 A | 4/1977 | Kuipers | |
| 4,328,548 A | 5/1982 | Crow et al. | |
| 4,346,384 A | 8/1982 | Raab | |
| 4,613,866 A | 9/1986 | Blood | |
| 4,688,037 A | 8/1987 | Krieg | |
| 4,737,794 A | 4/1988 | Jones | |
| 4,742,356 A | 5/1988 | Kuipers | |
| 5,307,072 A | 4/1994 | Jones, Jr. | |
| 5,453,686 A | 9/1995 | Anderson | |
| 5,640,170 A | 6/1997 | Anderson | |
| 5,831,260 A * | 11/1998 | Hansen | 250/221 |
| 6,369,564 B1 | 4/2002 | Khalfin et al. | |
| 6,377,041 B1 | 4/2002 | Jones, Jr. et al. | |
| 6,400,139 B1 | 6/2002 | Khalfin et al. | |
| 6,624,626 B2 | 9/2003 | Khalfin | |
| 6,762,600 B2 | 7/2004 | Khalfin | |
| 6,980,921 B2 * | 12/2005 | Anderson et al. | 702/150 |
| 7,096,148 B2 * | 8/2006 | Anderson et al. | 702/134 |
| 7,715,898 B2 * | 5/2010 | Anderson | 600/407 |
| 2005/0246122 A1 | 11/2005 | Jones et al. | |
| 2005/0285590 A1 | 12/2005 | Higgins et al. | |

(Continued)

*Primary Examiner* — David L Lewis
*Assistant Examiner* — Ross Williams
(74) *Attorney, Agent, or Firm* — Gard & Kaslow LLP

(57) ABSTRACT

Separate active and passive controllers each detect a generated magnetic field. The active controller phase corrects the detected magnetic field information transmitted from the passive controller and uses that to calculate the position and orientation of the passive controller. The active controller also phase corrects its own detected magnetic field information and uses that to calculate its position and orientation. The active controller transmits each of these calculated positions and orientations to a video game system directly or indirectly through the source of the generated magnetic field. The video game system is thus informed of the position and orientation of each of the active and passive controllers. Alternatively, the active controller creates a signal matrix using the phase corrected information and the position and orientation of a controller is calculated by either the source of the generated magnetic field or the video game system using the signal matrix.

14 Claims, 5 Drawing Sheets

(56) References Cited

U.S. PATENT DOCUMENTS

| | | |
|---|---|---|
| 2005/0285591 A1 | 12/2005 | Higgins et al. |
| 2006/0012571 A1 | 1/2006 | Rodgers et al. |
| 2006/0038555 A1 | 2/2006 | Higgins et al. |
| 2006/0255795 A1 | 11/2006 | Higgins et al. |
| 2008/0079752 A1 | 4/2008 | Gates et al. |
| 2008/0120061 A1* | 5/2008 | Higgins et al. ............... 702/150 |
| 2009/0030646 A1 | 1/2009 | Jones et al. |
| 2009/0076746 A1 | 3/2009 | Higgins |

* cited by examiner

PASSIVE AND ACTIVE VIDEO GAME CONTROLLERS WITH MAGNETIC POSITION SENSING

CROSS-REFERENCE TO RELATED APPLICATIONS

This application claims the benefit of U.S. Provisional Patent Application No. 61/134,499 filed on Jul. 10, 2008 and entitled "Video Game Controller with Magnetic Position Sensing," which is incorporated herein by reference in its entirety.

BACKGROUND

1. Field of the Invention

The field of this invention is in the area of computer input devices, including video game controllers.

2. Related Art

As the market for and variety of video games has increased, so has the demand for video game controllers. Early controllers were typically trackballs in a fixed mount thus requiring the user or game player to remain fairly stationary while playing the video game. Seeking to give the game player more freedom of movement as well as a greater range of video game input control, still later controllers were handheld and incorporated accelerometers to determine controller movement. Other, external detectors have also been used to detect controller movement. Such external detectors include ultrasound and optical mechanisms that attempt to track movement of a controller in a field of view.

A more advanced form of controller known in the art utilizes magnetic fields. Magnetic coils in these controllers detect the presence of a magnetic field to determine position and orientation of the controller. Although very precise, such magnetic field controllers typically require close proximity with the source of the magnetic field and a hardwired connection between the magnetic field source and the controller. Further, the complex calculations required for the controller to determine its position and orientation from the detected magnetic field typically requires significant processing within the controller.

It is, however, desirable to have a physically small wireless magnetic video game controller.

SUMMARY

An improved video game controller with magnetic position sensing includes an active controller in wireless communication with a video game system for determining and communicating the position and orientation of the active controller and at least one passive controller in either a wired or wireless communication with the active controller for the active controller to determine and communicate the position and orientation of the at least one passive controller to the video game system.

Each of the passive controllers includes a magnetic sensor for sensing a magnetic field and the ability to either wired or wirelessly communicate that sensed information to the active controller but not the ability to determine its position and orientation from the sensed information instead relying on the active controller to make that determination. The passive controller also relies on the active controller to communicate with the video game system.

The active controller also includes a magnetic sensor for sensing the magnetic field and, in addition to the ability to determine the position and orientation of the passive controller from the communicated sensed information from the passive controller, the ability to determine its own position and orientation from the sensed information from its magnetic sensor. The active controller also has the ability to communicate its own determined position and orientation to the video game system.

The passive controller, lacking some of the components and functionality of the active controller, can thus be physically smaller and lighter, require less power to operate, and cost less to manufacture. This also makes the passive controller easier for a game player to hold and also easier for the passive controller to be incorporated in a wrist band or strap, or other easily worn garment. Likewise, this makes it easier to incorporate the passive controller into some other device used or worn by the game player. Further, the passive controller can be place on or attached to a limb (i.e., arm, wrist, hand, finger, leg, ankle, foot or toe) or head of the game player.

The active controller, having more componentry and functionality, is able to support one or more passive controllers. Further, the active controller can be placed on or attached to the torso (i.e., waist, chest, shoulder, neck or back) or other body part (i.e., head or limb) of the game player. Such placement or attachment can be via a belt, a clip attachment, a hook and loop fastener, a strap, a headband, a backpack or other attachment method.

An exemplary video game controller system comprises a passive controller including a first magnetic sensor having a first plurality of sensor coils for sensing a magnetic field to generate first magnetic sensor data and an active controller in a physically separate housing from the passive controller. The active controller includes a second magnetic sensor having a second plurality of sensor coils for sensing the magnetic field to generate second magnetic sensor data, a wired receiver operative to receive the first magnetic sensor data from the passive controller, a processing unit operative to phase correct the first magnetic sensor data and calculate the position and orientation of the passive controller using the phase corrected first magnetic sensor data, the processing unit further operative to phase correct the second magnetic sensor data and calculate the position and orientation of the active controller using the phase corrected second magnetic sensor data, and a wireless transmitter operative to transmit to a video game system the calculated position and orientation of the active controller and the calculated position and orientation of the passive controller.

An exemplary video game controller method comprises generating first magnetic sensor data by sensing a magnetic field using a first controller including a first magnetic sensor having a first plurality of sensor coils, wired transmitting the first magnetic sensor data from the first controller to a second controller, phase correcting in the second controller the first magnetic sensor data, calculating in the second controller the position and orientation of the first controller using the phase corrected first magnetic sensor data, wirelessly transmitting from the second controller to a video game system the calculated position and orientation of the first controller, generating second magnetic sensor data by sensing the magnetic field using the second controller including a second magnetic sensor having a second plurality of sensor coils, phase correcting in the second controller the second magnetic sensor data, calculating in the second controller the position and orientation of the second device using the phase corrected second magnetic sensor data, and wirelessly transmitting from the second controller to the video game system the calculated position and orientation of the second controller.

Another exemplary video game controller system comprises a passive controller including a first magnetic sensor having a first plurality of sensor coils for sensing a magnetic field to generate first magnetic sensor data and an active controller in a physically separate housing from the passive controller. The active controller includes a second magnetic sensor having a second plurality of sensor coils for sensing the magnetic field to generate second magnetic sensor data, a wired receiver operative to receive the first magnetic sensor data from the passive controller, a processing unit operative to phase correct the first magnetic sensor data and create a first signal matrix using the phase corrected first magnetic sensor data, the processing unit further operative to phase correct the second magnetic sensor data and create a second signal matrix using the phase corrected second magnetic sensor data and a wireless transmitter operative to transmit the first signal matrix and the second signal matrix. This further exemplary video game controller system further comprises a source including a first plurality of source magnetic coils, a wireless receiver for receiving from the active controller wireless transmitter the first signal matrix and the second signal matrix, and a source processing unit operative to calculate the position and orientation of the active controller from the second signal matrix and calculate the position and orientation of the passive controller from the first signal matrix.

DETAILED DESCRIPTION

Figure 1:
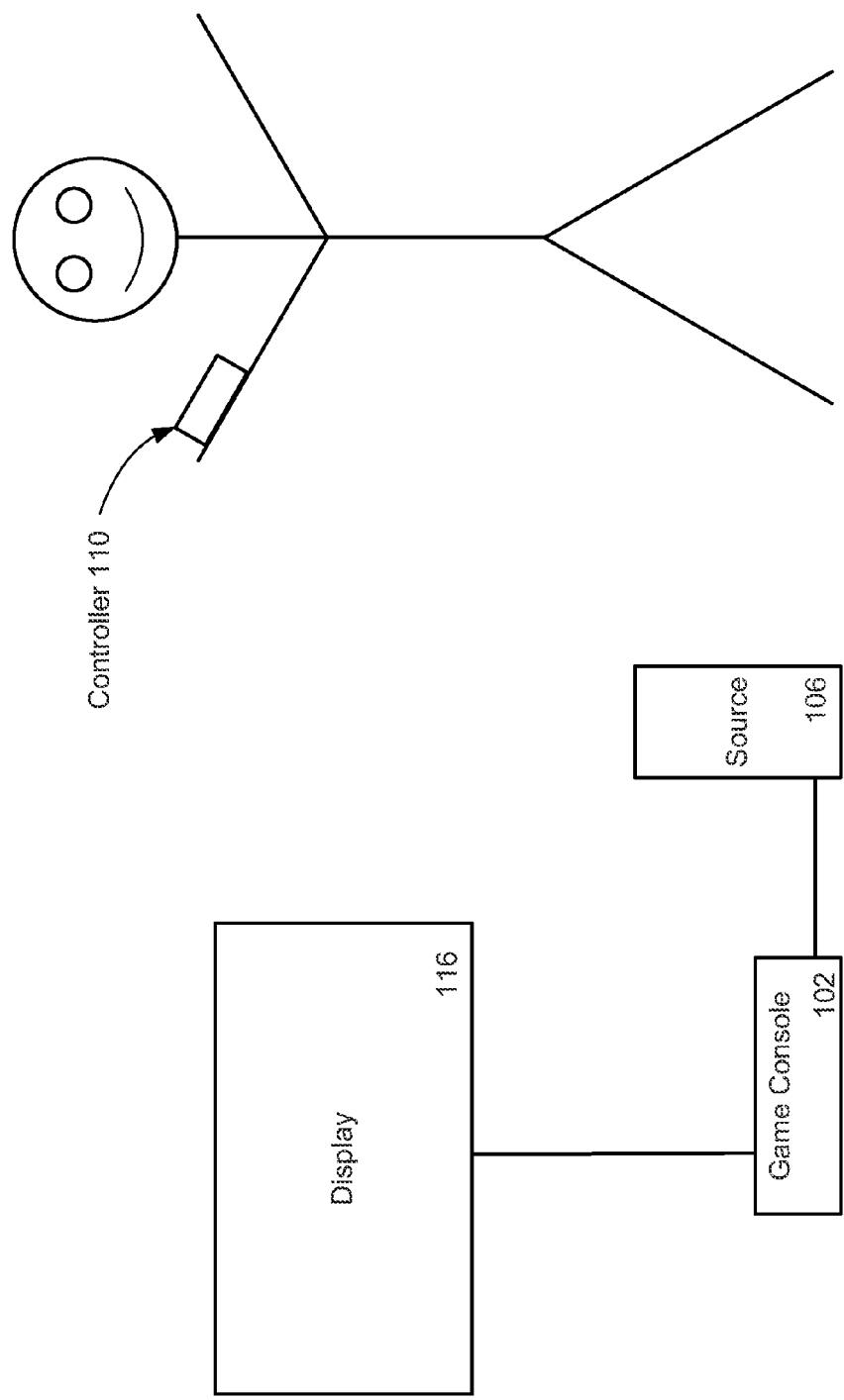
FIG. 1 is a block diagram of a prior art system.

Referring now to FIG. 1, a block diagram of a prior art system can be seen. Here, a game console 102 (e.g., a video game console, personal computer, smart phone or other computing system) is coupled via a cable or other means to a display 116 for display output of the video game in operation. Game console 102 is also coupled via a cable or other means to a source 106. Source 106 generates a magnetic field. A controller 110 detects the generated magnetic field and uses that information to calculate its three dimensional position and orientation. Controller 110 communicates its calculated position and orientation to game console 102 either directly or via source 106. This continues as controller 110 is moved thus continuously informing game console 102 of controller 110's three dimensional position and orientation.

Figure 2:
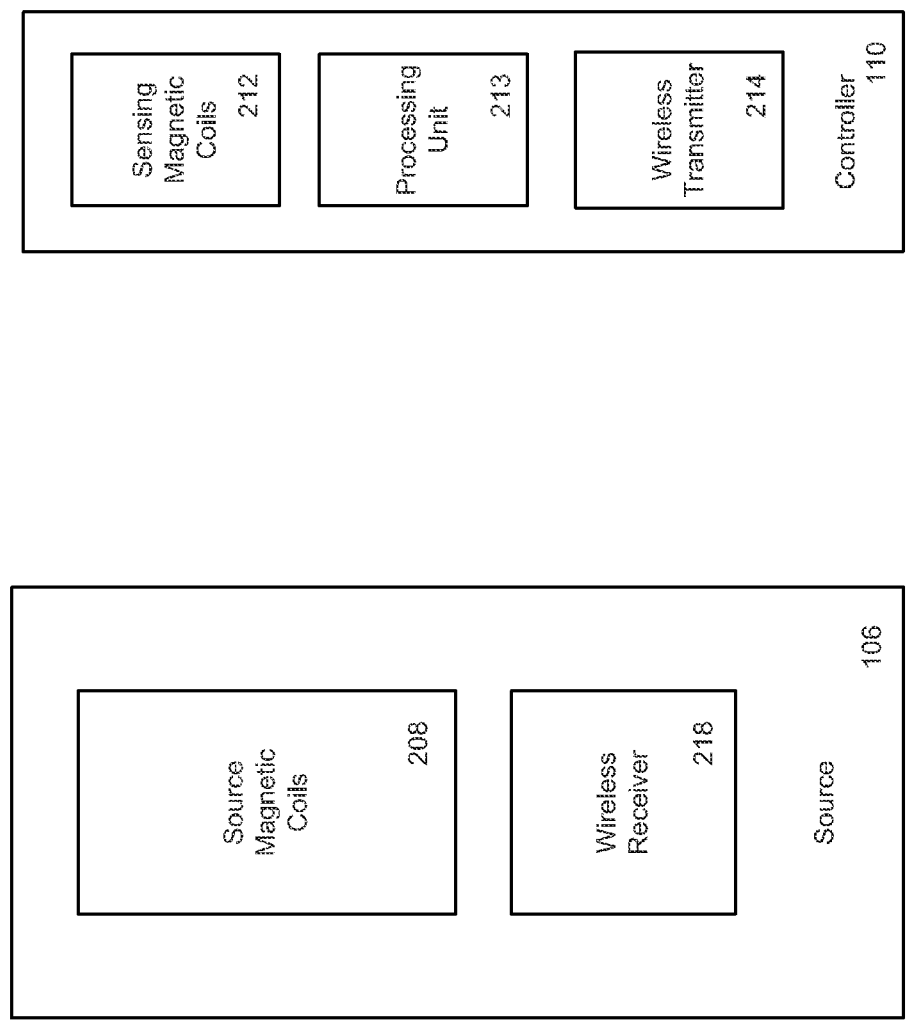
FIG. 2 is a block diagram of subcomponents of the prior art system.

Referring now to FIG. 2, a block diagram of subcomponents of prior art source 106 and controller 110 can be seen. Source 106 includes source magnetic coils 208 that, as known in the art, generate a magnetic field. Controller 110 includes sensing magnetic coils 212 that, as known in the art, sense the generated magnetic field. Controller 110 also includes a processing unit 213 which, as known in the art, takes as input the sensed magnetic field information from sensing magnetic coils 212 and calculates the three dimensional position and orientation of controller 110. Controller 110 also includes a wireless transmitter 214 which transmits the calculated position and orientation of controller 110 to a wireless receiver 218 of source 106.

It is known in the art how the magnetic field may be generated, the magnetic field may be sensed, and the three dimensional position and orientation may be calculated. Exemplary techniques and apparatus are described in U.S. Pat. No. 4,737,794, incorporated by reference in its entirety herein, and in the patents and patent applications listed in Appendix I of priority U.S. Provisional Patent Application No. 61/134,499, each of which is incorporated by reference in its entirety herein.

Figure 3:
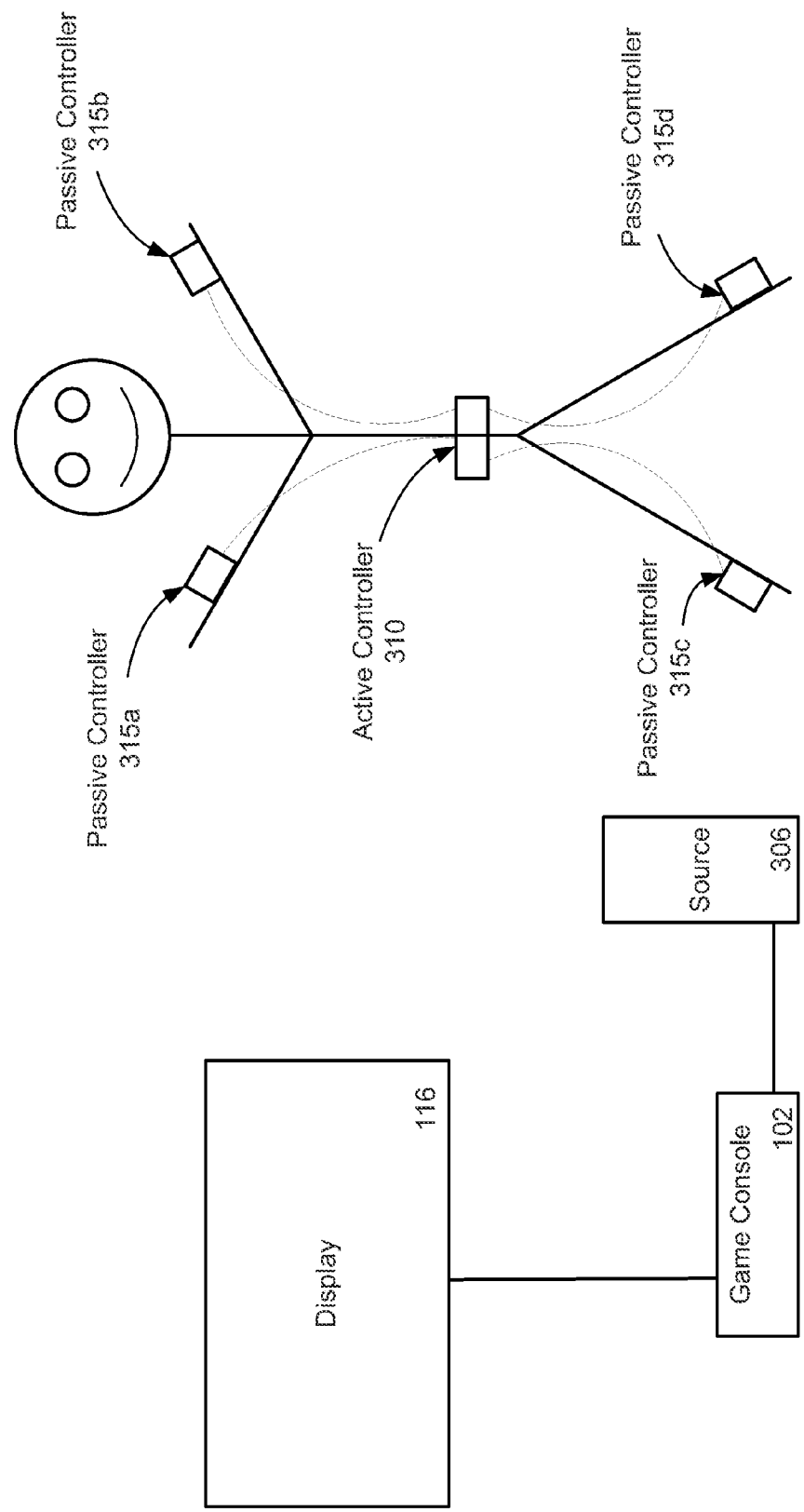
FIG. 3 is a block diagram of one embodiment of the present invention.

Referring now to FIG. 3, a block diagram of one embodiment of the present invention can be seen. Here game console 102 is coupled to display 116 for display output of the video game in operation. Game console 102 is also coupled via a cable or other means to a source 306. Source 306 generates a magnetic field in the same manner as did source 106 of FIGS. 1-2. Each of active controller 310 and passive controllers 315a, 315b, 315c and 315d detect the generated magnetic field. Passive controllers 315a, 315b, 315c and 315d communicate in a wired or wireless fashion, as depicted by dashed lines in the figure, their detected magnetic field information to active controller 310. Active controller 310 calculates the three dimensional position and orientation of each of passive controllers 315a, 315b, 315c and 315d, as well as the three dimensional position and orientation of active controller 310, using the detected magnetic field information from each. Active controller 310 wirelessly communicates the calculated position and orientation of each of passive controllers 315a, 315b, 315c and 315d and active controller 310 to game console 102 either directly or via source 306. This continues as each of passive controllers 315a, 315b, 315c and 315d and active controller 310 is moved thus continuously informing game console 102 of the position and orientation of each of passive controllers 315a, 315b, 315c and 315d and active controller 310.

Figure 4:
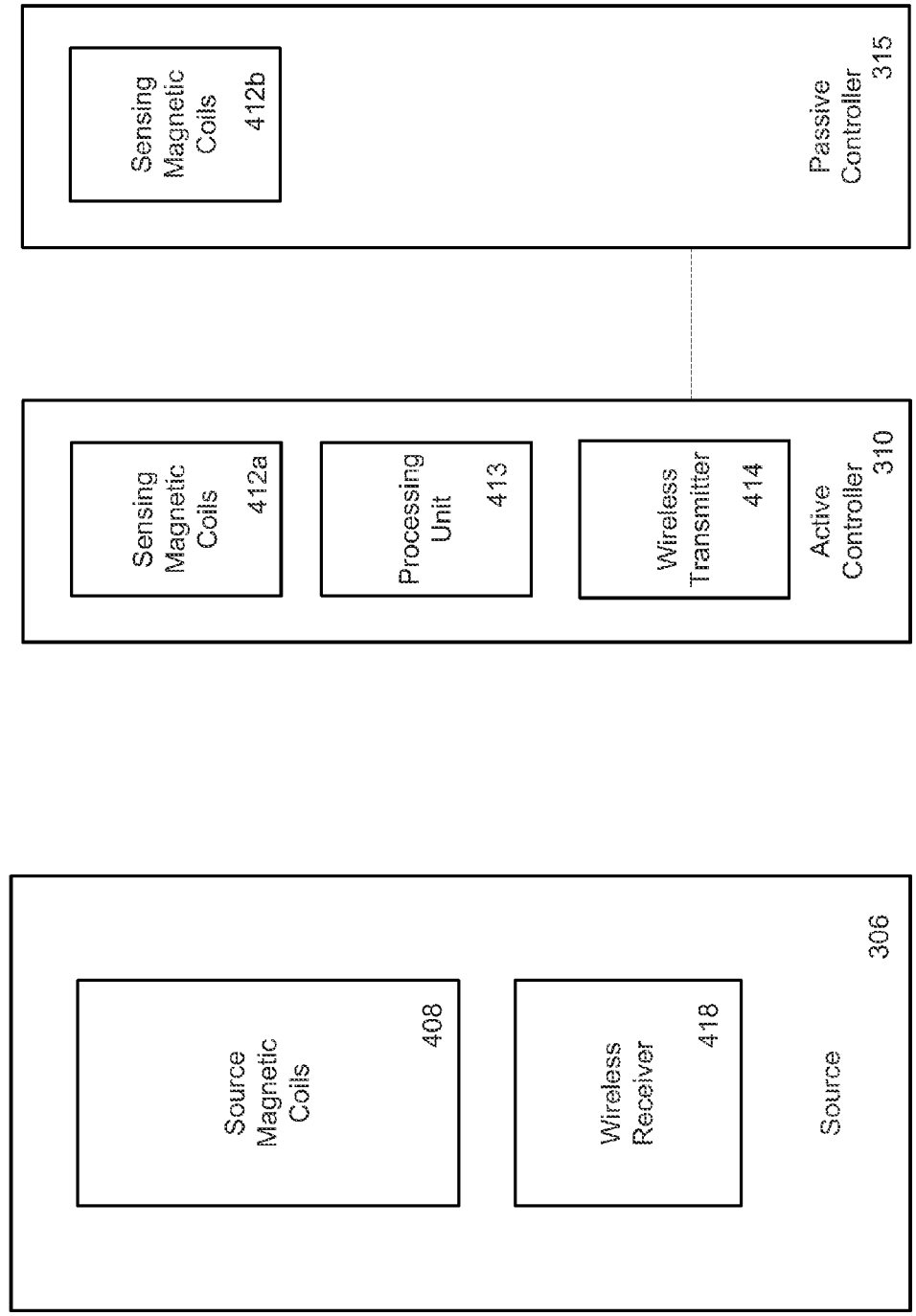
FIG. 4 is a block diagram of subcomponents of one embodiment of the present invention.

Referring now to FIG. 4, a block diagram of subcomponents of source 306, active controller 310 and passive controller 315 (representative of any of passive controller 315a, 315b, 315c and 315d) can be seen. Source 306 includes source magnetic coils 408 that, as known in the art, generate a magnetic field. Active controller 310 includes sensing magnetic coils 412a that, as known in the art, sense the generated magnetic field. Active controller 310 also includes a processing unit 413 which phase corrects the sensed magnetic field information as explained elsewhere herein. Processing unit 413 takes the phase corrected sensed magnetic field information and calculates, as known in the art, the three dimensional position and orientation of active controller 310. Active controller 310 also includes a wireless transmitter 414 which transmits the calculated position and orientation of active controller 110 to a wireless receiver 418 of source 306.

Passive controller 315 includes sensing magnetic coils 412b that, as is known in the art, sense the magnetic field generated by source magnetic coils 408. Passive controller 315 transmits the sensed magnetic field information from sensing magnetic coils 412b in a wired or wireless fashion, as depicted by a dashed line in the figure, to active controller 310. Processing unit 413 of active controller 310 phase corrects the sensed magnetic field information from sensing magnetic coils 412b of passive controller 315 and using that phase corrected information calculates, as known in the art, the three dimensional position and orientation of passive controller 315. Wireless transmitter 414 of active controller 310 transmits the calculated position and orientation of passive controller 315 to wireless receiver 418 of source 306.

This continues as passive controller 315 and active controller 310 are each moved thus continuously informing game console 102 of the position and orientation of each of passive controller 315 and active controller 310.

In a preferred embodiment and using known techniques, source magnetic coils 408 are three orthogonal coils. Also in a preferred embodiment and using known techniques, sensing magnetic coils 412a and 412b are each three orthogonal coils. In various embodiments not shown in the figures, each of active controller 310 and passive controller 315 typically also includes various additional known componentry in operation with sensing magnetic coils 412a and sensing magnetic coils 412b. For example, pre-amplifiers, amplifiers, and analog-to-digital converters (ADCS) will typically be included in each controller, whether active or passive, although in alternative embodiments some or all of such additional known componentry may only exist in active controller 310. It is to be understood that any combination of sensing coils, pre-amplifiers, amplifiers and ADCs, including only the sensing coils themselves, is referred to herein as a magnetic sensor.

As is known, processing sensed magnetic field information to calculate position and orientation of a controller typically involves intermediate steps in addition to phase correction as discussed elsewhere herein. For example, as described in incorporated by reference U.S. Pat. No. 4,737,794 (see, e.g., column 4 et seq.), sensed magnetic field information can first be turned into a signal matrix from which the position and orientation is calculated. As described, creating a signal matrix is a more involved set of operations than is calculating the position and orientation from the signal matrix which uses inherently simple algorithms. Stated differently, significantly more processing is required to create a signal matrix than to calculate position and orientation from the signal matrix. An alternative embodiment not shown capitalizes on this uneven division of labor. In this alternative embodiment the processing unit 413 still handles the bulk of the processing by creating a signal matrix from the phase corrected sensed magnetic field information but does not calculate the position and orientation of a controller. In this alternative embodiment the wireless transmitter 414 of active controller 310 then transmits the signal matrix to wireless receiver 418 of source 306. Source 306 or game console 102 uses the received signal matrix to calculate the position and orientation of the controller, a relatively simple computational task.

In a preferred embodiment not shown, each of active controller 310 and passive controller 315 also includes various known input mechanisms and interactive means such as buttons, lights and switches for video game player interaction.

In a preferred embodiment processing unit 413 is a digital signal processor (DSP) running software and/or firmware to perform the operations described herein but in alternative embodiments is an application specific integrated circuit (ASIC) or a general purpose processor running software to perform the operations described herein. It is to be understood that any combination of hardware and software or instead hardware only may likewise be used.

It is to be understood that active controller 310 and passive controller 315 are housed in physically separate housings although they may incorporated into a single wearable garment or piece of apparel.

Figure 5:
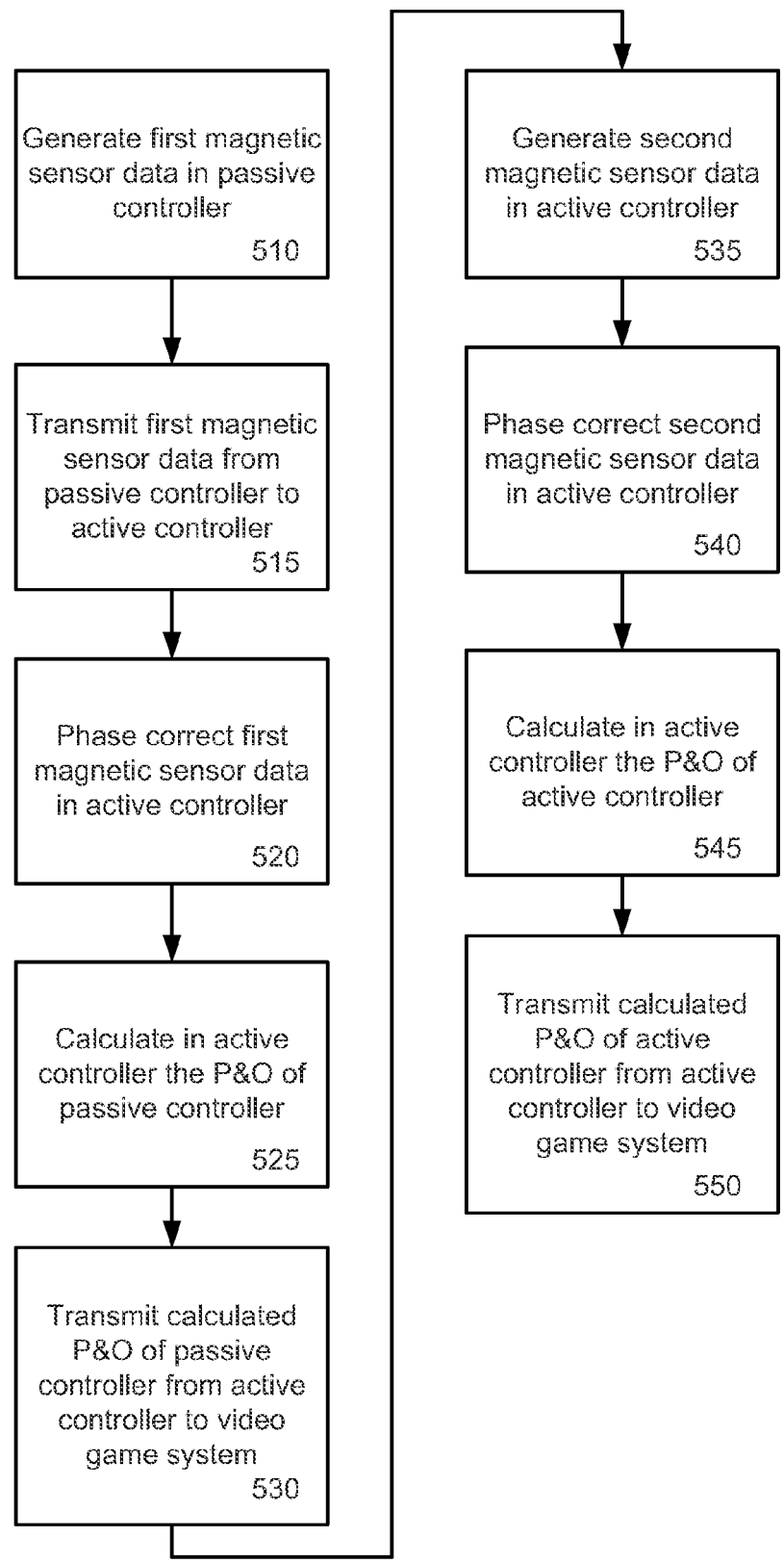
FIG. 5 is a flowchart of one embodiment of the present invention.

Referring now to FIG. 5, a flowchart of one embodiment of the present invention can be seen.

In step 510, first magnetic sensor data is generated in a passive controller. This may be accomplished by sensing magnetic coils 412b in passive controller 315 detecting a magnetic field generated by source magnetic coils 408 of source 306.

In step 515, the generated first magnetic sensor data is transmitted from the passive controller to an active controller. This may be accomplished by passive controller 315 transmitting the detected magnetic field information to active controller 310.

In step 520, the first magnetic sensor data is phase corrected in the active controller. Because the passive controller is not in wired communication with the source of the generated magnetic field, the sensed or detected first magnetic sensor data may not be in time or phase alignment with the generated magnetic field. Phase correcting the first magnetic sensor data brings the detected magnetic sensor data into alignment with the generated magnetic using techniques known in the art. Such known techniques include those described in U.S. patent application Ser. No. 12/017,392 (published as US 2008/0120061), U.S. patent application Ser. No. 12/157,725 (published as US 2009/0030646) and U.S. patent application Ser. No. 12/283,296 (published as US 2009/0076746), each of which is incorporated by reference herein. This phase correction may be accomplished by processing unit 413 of active controller 310.

In step 525, the three dimensional position and orientation of the passive controller is calculated in the active controller using techniques known in the art. This may be accomplished by processing unit 413 of active controller 310.

In step 530, the calculated position and orientation of the passive controller is transmitted from the active controller to a video game system. This may be accomplished by wireless transmitter 414 of active controller 310 transmitting to wireless receiver 418 of source 306 which in turn communicates with game console 102.

In step 535, second magnetic sensor data is generated in an active controller. This may be accomplished by sensing magnetic coils 412a in active controller 310 detecting a magnetic field generated by source magnetic coils 408 of source 306.

In step 540, the second magnetic sensor data is phase corrected in the active controller. Because the active controller is not in wired communication with the source of the generated magnetic field, the sensed or detected second magnetic sensor data may not be in time or phase alignment with the generated magnetic field. Phase correcting the second magnetic sensor data brings the detected magnetic sensor data into alignment with the generated magnetic using techniques known in the art as explained elsewhere herein. This phase correction may be accomplished by processing unit 413 of active controller 310.

In step 545, the three dimensional position and orientation of the active controller is calculated in the active controller using techniques known in the art. This may be accomplished by processing unit 413 of active controller 310.

In step 550, the calculated position and orientation of the active controller is transmitted from the active controller to a video game system. This may be accomplished by wireless transmitter 414 of active controller 310 transmitting to wireless receiver 418 of source 306 which in turn communicates with game console 102.

This process continues as the active controller and the passive controller are each individually moved thus continuously informing the video game system of the three dimensional position and orientation of each.

It is to be understood that the present invention is not limited to the particular sequence depicted in FIG. 5. For example, steps 510 through 530 may operate during the same period of time as, or overlap in time, steps 535 through 550. As another example, phase correction steps 520 and 540 may be combined into a single phase correction operation before calculation steps 525 and 545 are performed. In another example, calculation steps 525 and 545 may be combined into a single calculation operation before steps 530 and 550 are performed. In yet another example, transmit steps 530 and 550 may be combined into a single transmit operation.

In an alternative embodiment not shown, in steps 525 and 545, a signal matrix is created in the active controller which may be accomplished by processing unit 413 of active controller 310. In this alternative embodiment, in steps 530 and 550, the signal matrix is transmitted from the active controller to a video game system which may be accomplished by wireless transmitter 414 of active controller 310 transmitting to wireless receiver 418 of source 306 which in turn communicates with game console 102. In this alternative embodiment, the received signal matrix is used to calculate the position and orientation of the controller either within source 206 or game console 102.

It is to be understood that various alternative embodiments and sequences of operation are to be included in the scope of the present invention. For example, in one embodiment there may be only one passive controller and only one passive controller while in another embodiment there may be fewer than four passive controllers or more than four passive controllers. In another embodiment, there may be more than one active controller each of which interoperates with one or more passive controllers.

In a further embodiment, an active controller may calculate the position and orientation of more than one of an active and passive controller before transmitting the calculated position of each to a source. In a still further embodiment, the active controller may transmit the calculated position of more than one active or passive controller sequentially or at the same time.

In a still further embodiment, wireless receiver 418 may be coupled to or incorporated into game console 102 so that active controller 310 can transmit the calculated position of one or more controller directly to game console 102 rather than going through source 306.

It is to be understood that game console 102 can also be utilized for some process other than operation of a video game. In such event, the apparatus and operations described herein are equally applicable to player or user interaction with such other process in essentially the same manner as described herein. As such, the present invention can be utilized with any computing system requiring user controller input.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. A video game controller system comprising:
    a passive controller including a first magnetic sensor having a first plurality of sensor coils for sensing a magnetic field to generate first magnetic sensor data; and
    an active controller in a physically separate housing from the passive controller, the active controller including:
        a second magnetic sensor having a second plurality of sensor coils for sensing the magnetic field to generate second magnetic sensor data;
        a wired receiver operative to receive the first magnetic sensor data from the passive controller;
        a processing unit operative to phase correct the first magnetic sensor data and calculate a position and orientation of the passive controller using the phase corrected first magnetic sensor data;
        the processing unit further operative to phase correct the second magnetic sensor data and calculate a position and orientation of the active controller using the phase corrected second magnetic sensor data; and
        a wireless transmitter operative to transmit to a video game system the calculated position and orientation of the active controller and the calculated position and orientation of the passive controller.

2. The video game controller system of claim 1 wherein the processing unit is a DSP.

3. The video game controller system of claim 1 further comprising a source including;
    a first plurality of source magnetic coils; and
    a wireless receiver for receiving from the active controller wireless transmitter the calculated position and orientation of the active controller and the calculated position and orientation of the passive controller for communication to the video game system.

4. The video game controller system of claim 1 wherein the active controller is configured to be placed on or attached to the torso of a game player.

5. The video game controller system of claim 1 wherein the passive controller is configured to be placed on or attached to the limb of a game player.

6. The video game player system of claim 1 wherein the passive controller is configured to be placed on or attached to the head of a game player.

7. A video game controller method comprising:
    generating first magnetic sensor data by sensing a magnetic field using a first controller including a first magnetic sensor having a first plurality of sensor coils;
    transmitting the first magnetic sensor data via a wired connection from the first controller to a second controller;
    phase correcting in a processing unit of the second controller the first magnetic sensor data;
    calculating in the second controller a position and orientation of the first controller using the phase corrected first magnetic sensor data;
    wirelessly transmitting from the second controller to a video game system the calculated position and orientation of the first controller;
    generating second magnetic sensor data by sensing the magnetic field using the second controller including a second magnetic sensor having a second plurality of sensor coils;
    phase correcting in the processing unit of the second controller the second magnetic sensor data;
    calculating in the second controller a position and orientation of the second device using the phase corrected second magnetic sensor data; and
    wirelessly transmitting from the second controller to the video game system the calculated position and orientation of the second controller.

8. The video game controller method of claim 7 wherein the phase correcting is done by a DSP.

9. The video game controller method of claim 7 further comprising generating the magnetic field using a source including a first plurality of source magnetic coils.

10. The video game controller method of claim 9 wherein wirelessly transmitting from the second controller to the video game system is by the source receiving the wireless transmission and communicating the wireless transmission to the video game system in a wired transmission.

11. The video game controller method of claim 7 wherein the method is repeated as the first controller and the second controller each continue to be separately moved.

12. A video game controller system comprising:
a passive controller including a first magnetic sensor having a first plurality of sensor coils for sensing a magnetic field to generate first magnetic sensor data; and
an active controller in a physically separate housing from the passive controller, the active controller including:
a second magnetic sensor having a second plurality of sensor coils for sensing the magnetic field to generate second magnetic sensor data;
a wired receiver operative to receive the first magnetic sensor data from the passive controller;
a processing unit operative to phase correct the first magnetic sensor data and create a first signal matrix using the phase corrected first magnetic sensor data;
the processing unit further operative to phase correct the second magnetic sensor data and create a second signal matrix using the phase corrected second magnetic sensor data; and
a wireless transmitter operative to transmit to a video game system the first signal matrix and the second signal matrix.

13. The video game controller system of claim 12 wherein the processing unit is a DSP.

14. The video game controller system of claim 12 further comprising a source including;
a first plurality of source magnetic coils;
a wireless receiver for receiving from the active controller wireless transmitter the first signal matrix and the second signal matrix; and
a source processing unit operative to calculate the position and orientation of the active controller from the second signal matrix and calculate the position and orientation of the passive controller from the first signal matrix.

* * * * *